May 3, 1938.    H. SCHMUTZ    2,116,046

MOTOR CAR BRAKE APPARATUS

Filed Sept. 8, 1934

Inventor,
H. Schmutz

By: Glascock Downing Seebold
Attys.

Patented May 3, 1938

2,116,046

UNITED STATES PATENT OFFICE 2,116,046

MOTOR-CAR BRAKE APPARATUS

Hans Schmutz, Bern, Switzerland

Application September 8, 1934, Serial No. 743,252
In Switzerland September 9, 1933

6 Claims. (Cl. 121—48)

My invention relates to brake actuating apparatus for motor cars and other vehicles. The object of my invention is to provide a brake actuating apparatus which can be readily operated by the occupant of the vehicle in which it is installed and which is very effective and certain in its operation.

The principal object of my invention is to provide a number of cells, one behind the other in line, each cell being divided into two chambers by means of a flexible diaphragm all the diaphragms being connected with a brake rod and each cell having a channel to communicate one of the chambers to a vacuum which is controlled by a distributing valve. The cells are formed by partitions, provided with packings and joint rings inserted in borings in the centers of said partitions. The brake rod may be composed of a series of short rods which are threaded at their ends and screwed together, so as to clamp a diaphragm between them. The end-cells are formed by covers, one of said covers being provided with a distributing valve casing.

Referring to the accompanying drawing illustrating my invention,

Although the present invention is applicable to a wide range of uses, the following description will be primarily limited to its application to motor vehicles. Its application to other uses will be apparent from the description and is considered within the scope of the present invention.

Figure 1:
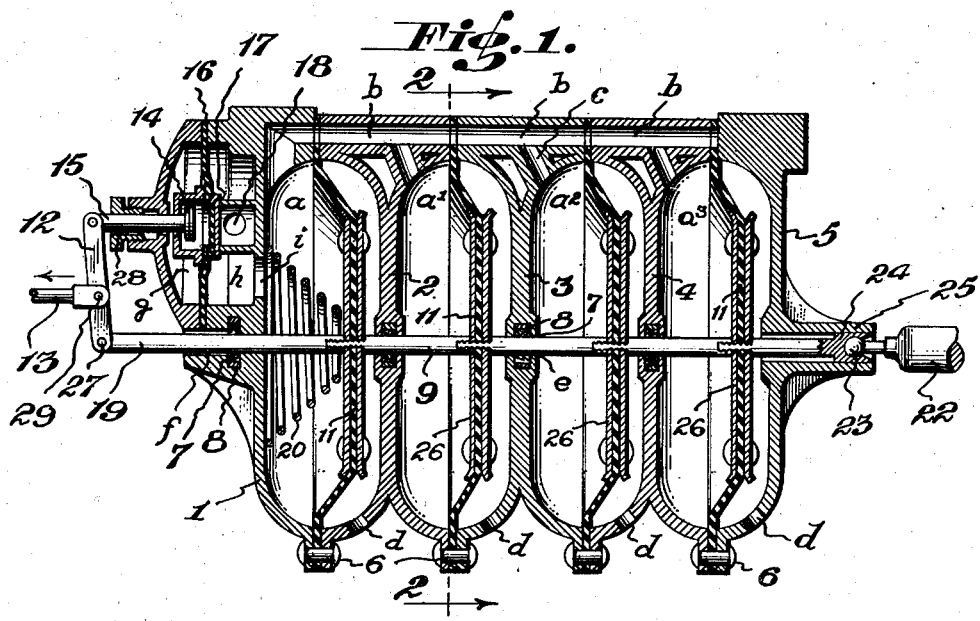
Figure 1 is a vertical longitudinal section of the apparatus, in accordance with the invention.
Figure 2:
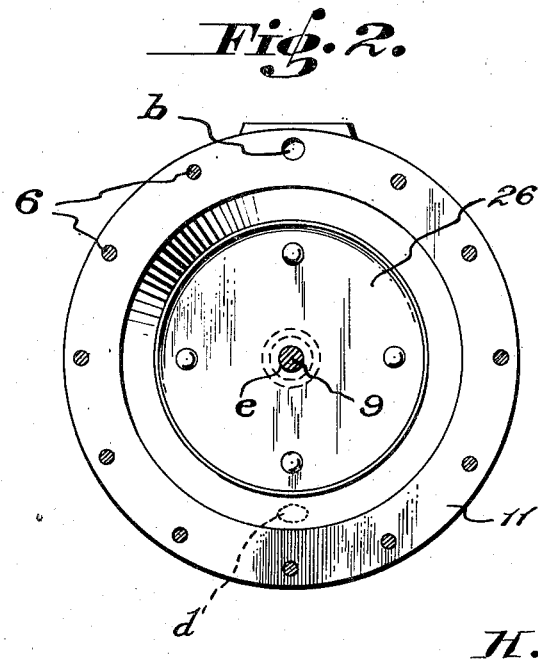
Figure 2 is a front elevation of one of the cells taken on the line 2—2 of Figure 1.

In the drawing, a pipe extends from the manifold of the motor to a distributing valve, the mouth of said pipe being designated at 18 in Figure 1. The distributing valve is connected with the casing of the brake-apparatus which consists of a number of cells $a$, $a^1$, $a^2$, $a^3$, adjacent each other in line, the number of which may be increased according to the weight of the vehicle. The casing consists of the front cover 1, a number of partitions 2, 3, 4 and a back-cover 5. The partitions 2, 3, 4, are shaped so as to constitute the adjoining halves of adjacent cells and may be held together at their edges in pairs by means of nuts and bolts or rivets 6. Each partition is provided with a channel $b$, a connecting channel $c$, an air passage $d$, and a central aperture or boring $e$.

In each of the borings $e$, packing 7 and joint ring 8 is inserted. Furthermore, each cell has a short rod 9 provided with a threaded hole at one end and a threaded joining part at the other end. These short rods are screwed together, so as to clamp a diaphragm 11 therebetween and thereby form a brake rod in connection with a longer rod 19 at one end and a ball socket joint 23 with brake lever 22 at the other end.

The front cover 1 has a boring similar to those of the partitions which is also provided with a packing 7 with encircling joint ring 8. A connecting lever 12 is pivoted to the rod 19 at 27. The lever 12 is also pivoted to the shaft 15 of the distribution valve, and is also pivotally connected to the pedal rod 13 at 29 thereby forming a loose link in the rod connection.

The distributing valve is composed in a well known manner of a valve head 14, a small diaphragm 16 clamped around its circumference between the elements of the valve casing, and an opening 17 communicating with the pipe 18. The distributing valve casing is divided by the diaphragm into two chambers $g$ and $h$. Chamber $g$ is open to the atmospheric air by an opening 28 along the shaft 15, while the chamber $h$ is connected to the first cell $a$ by means of a passage $i$. The first cell has an angular channel communicating with the channel $b$ of the first partition 2 and the diaphragm, which is clamped around its circumference between the cover 1 and the partition 2 has an opening, so that the angular channel and the channel $b$ are in communication. The channels $b$ of the partitions and the openings of the diaphragms are in line, thus forming a continuous pipe. Small connecting channels $c$ are provided from the channels $b$ to the interior of the cells $a^1$, $a^2$, $a^3$. The channel $b$ is closed by the back cover 5. The back cover 5 has a boring in which the ball and socket joint 23, 24 is inserted. Each cell contains a diaphragm 11 and each diaphragm may be supported or mounted between two metal plates or discs 26.

In order to hold the diaphragms in the position shown in Figure 1, a spiral spring 20 is inserted in the first cell $a$.

Having now described the general construction of my brake actuating apparatus the operation of the same is as follows:

By pulling the pedal rod 13 in the direction of the arrow the loose link 12 pulls the brake rod 19, 9, 23, 22 to the left, thus pressing the first diaphragm 11 against the spring 20. The pivot 27 then acts as a fixed point and the loose linkage transposes the pulling movement of the pedal rod 13 to the shaft 15 which carries the valve head 14, thereby shutting off the air passage 28 along the shaft 15. The small diaphragm 16 is removed from the opening 17 thereby exhausting the chamber $h$, cell $a$, the channel $b$, the connecting channels $c$ and the chambers $a^1$, $a^2$, $a^3$, through the pipe 18. The diaphragms 11 are now freely acted upon by the atmospheric air admitted through air passages $d$ of the partitions so that the spring 20 is compressed and the brake rod pulled further to the left. At this stage the pivot 29 acts as a fixed point and the movements of the shaft 15 of the distributing valve is reversed, thus closing the opening 17 again. Further pull on the pedal rod 13 will cause an oscillating vibration of the small diaphragm 16 and the apparatus will be exhausted to the same degree as the pull of the pedal rod. Should, by accident, the distributing valve be out of order or should one of the diaphragms break, the whole rod connection 19, 9, 23, 22 may be actuated mechanically. Looseness of one of the diaphragms will not cause any trouble, because the diameters of the connecting channels $c$ are relatively small. The brakes are released by refilling the chambers $a$, $a^1$, $a^2$, $a^3$, with atmospheric air by means of the distributing valve.

By the arrangement of a number of diaphragms, one behind the other in a fixed housing and connected by a channel, uniform movement of all diaphragms is caused and uniform application of power to all diaphragms at the same time is obtained. In order to increase the power of the brake apparatus, the number of cells may be increased to 5 or 6 units for instance, or may be decreased to 3, 2 or even 1 unit only, depending on the weight or loading of the vehicle, tractor or train.

Formal changes may be made in the specific embodiment of the invention described, without departing from the spirit or substance of the broad invention, the scope of which is commensurate with the appended claims.

What I claim is:

1. A fluid pressure apparatus for actuating brakes for motor cars and other vehicles comprising a casing having walls, a flexible diaphragm having a central aperture secured circumferentially to said casing, said casing being provided with a central bore and a packing in at least one of the walls, a brake rod passing through said bore and said aperture and comprising two sections screwed together, and supporting disks having central apertures secured on both sides of said diaphragm, said diaphragm and supporting disks being securely fixed to said brake rod by said brake rod screw connection.

2. A fluid pressure apparatus for actuating brakes for motor cars and other vehicles comprising a casing having a plurality of cells arranged in alignment with one another, a plurality of flexible diaphragms each having a central aperture and each being secured circumferentially to said casing within each cell, said casing having central bores and packings therein, a brake rod passing through said bores and apertures composed of a plurality of sections screwed together, and supporting discs having central apertures positioned on both sides of each diaphragm, said diaphragms and supporting discs being securely fixed to said brake rod by said brake rod screw connections.

3. A fluid pressure apparatus as claimed in claim 1, further comprising a fluid pressure pipe, said casing having a passage on one side of the diaphragm allowing communication between said fluid pressure pipe and said casing, said casing having an exhaust passage on the other side of said diaphragm communicating with the atmosphere.

4. A fluid pressure apparatus as claimed in claim 2, further comprising a fluid pressure pipe, said casing having a plurality of passages each on the same corresponding side of each of said diaphragms, and allowing communication between said fluid pressure pipe and said casing, said casing having a plurality of exhaust passages each on the side of each diaphragm opposite to the first named passage, each of said exhaust passages communicating with the atmosphere.

5. A fluid pressure apparatus as claimed in claim 1, further comprising a fluid pressure pipe, said casing having a passage on one side of the diaphragm allowing communication between said fluid pressure pipe and said casing, said casing having an exhaust passage on the other side of said diaphragm communicating with the atmosphere, a distributing valve for controlling the pressure within said fluid pressure pipe and a brake pedal rod operatively connected thereto.

6. A fluid pressure apparatus as claimed in claim 2, further comprising a fluid pressure pipe, said casing having a plurality of passages each on the same corresponding side of each of said diaphragms, and allowing communication between said fluid pressure pipe and said casing, said casing having a plurality of exhaust passages each on the side of each diaphragm opposite to the first named passage, each of said exhaust passages communicating with the atmosphere, a distributing valve for controlling the pressure within said fluid pressure pipe, an operating lever connected to said valve and to said brake rod and a brake pedal rod connected to said operating lever.

HANS SCHMUTZ.